(12) United States Patent
Hung

(10) Patent No.: US 9,482,368 B1
(45) Date of Patent: Nov. 1, 2016

(54) ADJUSTABLE FIXTURE FOR CLAMPING A TUBE-LIKE OBJECT

(71) Applicant: Cheng-Ching Hung, Taoyuan (TW)

(72) Inventor: Cheng-Ching Hung, Taoyuan (TW)

( * ) Notice: Subject to any disclaimer, the term of this patent is extended or adjusted under 35 U.S.C. 154(b) by 0 days.

(21) Appl. No.: 14/969,804

(22) Filed: Dec. 15, 2015

(51) Int. Cl.
| | |
|---|---|
| *F16L 3/00* | (2006.01) |
| *F16L 3/10* | (2006.01) |
| *B25B 5/14* | (2006.01) |
| *B25B 5/10* | (2006.01) |
| *F16B 2/10* | (2006.01) |
| *F16B 2/18* | (2006.01) |

(52) U.S. Cl.
CPC ............... *F16L 3/105* (2013.01); *B25B 5/103* (2013.01); *B25B 5/147* (2013.01); *F16B 2/10* (2013.01); *F16B 2/185* (2013.01); *F16L 3/1075* (2013.01)

(58) Field of Classification Search
CPC ......... F16L 3/105; F16L 3/1075; F16B 2/10; F16B 2/185; B25B 5/103; B25B 5/147
USPC ............... 248/230.4, 229.13, 229.23, 231.51
See application file for complete search history.

(56) References Cited

U.S. PATENT DOCUMENTS

| 3,848,838 | A | * | 11/1974 | Thomas | ................... | A47C 7/66 248/231.51 |
|---|---|---|---|---|---|---|
| 4,437,791 | A | * | 3/1984 | Reynolds | ................ | E21B 17/01 403/386 |
| 5,170,540 | A | * | 12/1992 | Oetiker | ................. | F16L 33/035 24/20 CW |
| 7,861,982 | B1 | * | 1/2011 | McClure | ............... | F16L 3/1075 248/229.14 |
| 2014/0197628 | A1 | * | 7/2014 | Giraldi | .................... | F16L 35/00 285/87 |
| 2016/0003378 | A1 | * | 1/2016 | Frizzell | .................... | H02G 3/32 248/74.5 |

\* cited by examiner

*Primary Examiner* — Anita M King
(74) *Attorney, Agent, or Firm* — Rabin & Berdo, P.C.

(57) ABSTRACT

An adjustable fixture includes a lower clamp piece, an upper clamp piece covering the lower clamp piece at a closed position to define a clamping space. The upper clamp piece has an anti-hook edge projecting outward. A torque rod has a first end pivoted to one side of the lower clamp piece. A traction element has a first traction end pivoted to the torque rod adjacent to the first end thereof and a second traction end that defines a threaded through hole to receive a thread bolt threadedly and movably therethrough; and a hook disposed on a second traction end of the traction element and operably associated so as to be movable together with the threaded bolt in such a manner to engage the hook with the anti-hook edge of the upper clamp piece when the upper clamp piece is disposed at the closed position.

7 Claims, 6 Drawing Sheets

ADJUSTABLE FIXTURE FOR CLAMPING A TUBE-LIKE OBJECT

BACKGROUND OF THE INVENTION

1. Field of the Invention

The present invention elates generally to an adjustable fixture; and more particularly to an adjustable fixture that is adapted to clamp a tube-like object regardless of variation in the dimension.

2. The Prior Arts

FIG. 1 illustrates a conventional fixture 26 for clamping a tube-like object 2. The conventional fixture 26 includes a lower clamp piece 3; an upper clamp piece 6 pivoted to and covering the lower clamp piece 3 at a closed position to define a clamping space 9 for receiving the tube-like object 2 and having an anti-hook edge 10 projecting outward; a torque rod 11 having a first end 12 pivoted to the lower clamp piece 3; a traction element 13 having a first traction end 14 pivoted to the torque rod 11 adjacent to the first end 12; and a hook 16 disposed on a second traction end 15 of the traction element 13 such that when it is desired to clamp the tube-like object 2, the latter is firstly disposed in the clamping space 9, after which a second end of the torque rod 11 is pivoted and pressed downward relative to the lower clamp piece 3 which action results in engagement of a barbed end 17 of the hook 16 relative to the anti-hook edge 10 of the upper clamp piece 6, thereby preventing the upper clamp piece 6 to pivot back to an open position. In other words, the tube-like object 2 is clamped securely in the clamping space 9 of the conventional fixture 26.

One drawback of the conventional fixture 26 resides in that only a tube-like object 2 of a specific dimension can be clamped within the clamping space, thereby restricting the utility range of the conventional fixture 26.

Hence, there exists an unfavorable problem regarding the utility of the conventional fixture 26.

SUMMARY OF THE INVENTION

A primary objective of the present invention is to provide an adjustable fixture that is adapted to clamp a tube-like object regardless of variation in the dimension.

An adjustable fixture of the present invention for clamping a tube-like object regardless of variation in the dimension, includes: a lower clamp piece of generally semi-circle shape having first and second lateral sides opposite to each other; an upper clamp piece of generally semi-circle shape having third and fourth lateral sides opposite to each other, wherein the third lateral side is connected pivotally to the second lateral side of the lower clamp piece such that the upper clamp piece is pivotable relative to the lower clamp piece between a closed position, where the upper clamp piece covers the lower clamp piece to define a clamping space therebetween, and an open position, where the lower clamp piece is uncovered by the upper clamp piece, the upper clamp piece further having an anti-hook edge projecting outward from the fourth lateral side; a torque rod having a first end pivoted to the first lateral side of the lower clamp piece; a traction element having a first traction end pivoted to the torque rod adjacent to the first end thereof and a second traction end that is opposite to the first traction end and that defines a threaded through hole, the traction element further including a thread bolt disposed threadedly and movably in the threaded through hole; and a hook disposed on the second traction end of the traction element and operably associated so as to be movable together with the threaded bolt in such a manner to engage the hook with the anti-hook edge of the upper clamp piece when the upper clamp piece is disposed at the closed position, thereby preventing the upper clamp piece to pivot back to the open position.

In one embodiment of the present invention, the adjustable fixture further includes a bottom seat with external threads extending downwardly from the lower clamping piece for fastening onto a stationary foundation.

In one embodiment of the present invention, the adjustable fixture further includes lower and upper cushion pads configured to be mounted on inner surfaces of the lower and upper clamping pieces.

Preferably, a hinge is used for connecting pivotally the third lateral side of the upper clamp piece to the second lateral side of the lower clamp piece, or for connecting pivotally the first end of the torque rod to the first lateral side of the lower clamp piece or for connecting pivotally the first traction end of the traction element to the torque rod adjacent to the first end thereof.

Preferably, in this embodiment, the traction element is generally L-shaped and extends toward the upper clamp piece when the latter is in the closed position. The torque rod has a rod section being bent 90 degree relative to the upper clamp piece in a first direction and another rod section being bent 90 degree relative to the upper clamp piece in a second direction opposite to the first direction.

In one embodiment of the present invention, the threaded bolt has a bolt head. The adjustable fixture of the present invention further includes a threaded nut mounted threadedly on the threaded bolt in such a manner to secure the hook between the bolt head and the threaded nut, thereby permitting engagement of the hook with the anti-hook edge of the upper clamp piece when the upper clamp piece is disposed at the closed position.

In one embodiment of the present invention, the second traction end of the traction element defines three threaded through holes respectively receiving three threaded bolts therein. Each of the threaded bolts has a bolt head. The adjustable fixture of the present invention includes three threaded nuts respectively and threadedly mounted on the threaded bolts and the hook is formed with three sleeve holes respectively sleeved around the corresponding threaded bolt in such a manner that the hook is secured between adjacent pair of the bolt head and the threaded nut, thereby preventing wobbling of the hook relative to the threaded bolts and providing additional engagement between the hook and the threaded bolt.

One distinct feature of the present invention is that regardless of variation in the dimension of tube-like object, the adjustable fixture fabricated according to the present invention is capable of clamping the object of different dimensions therein.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
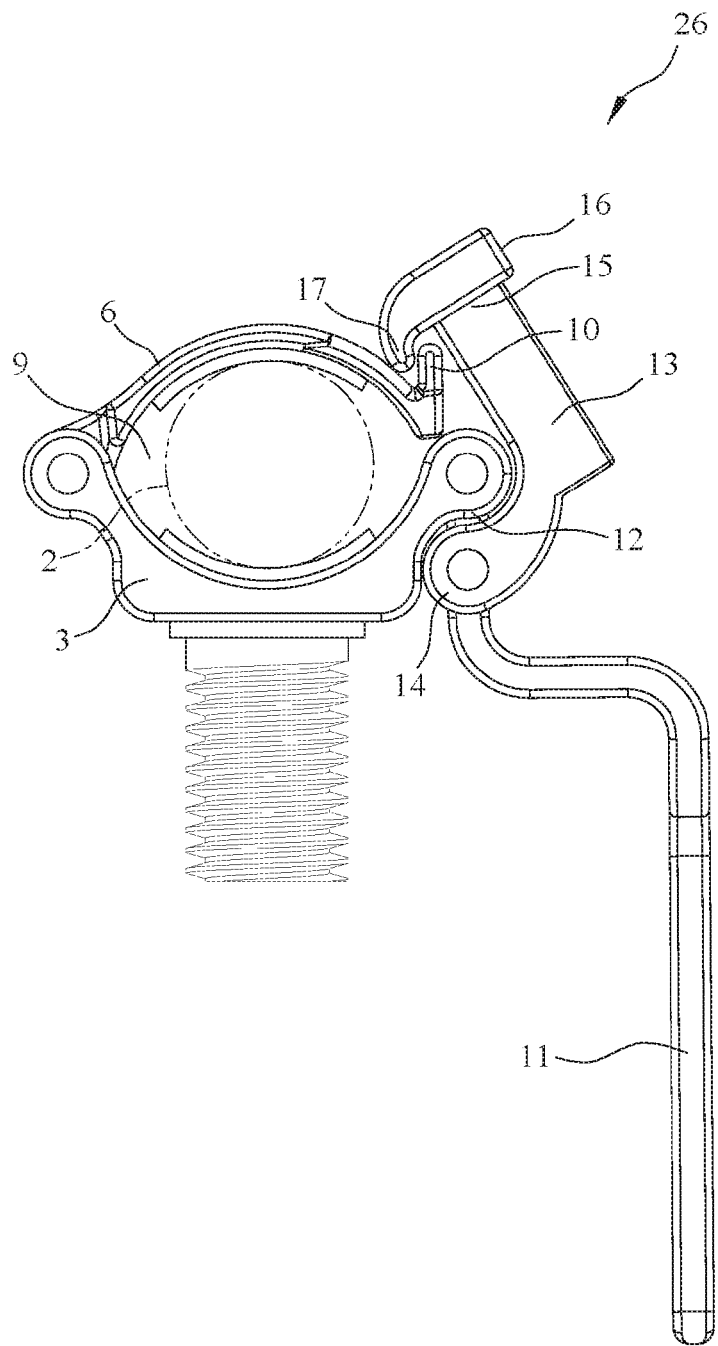
FIG. 1 illustrates a lateral side view of a conventional fixture for clamping a tube-like object.
Figure 2:
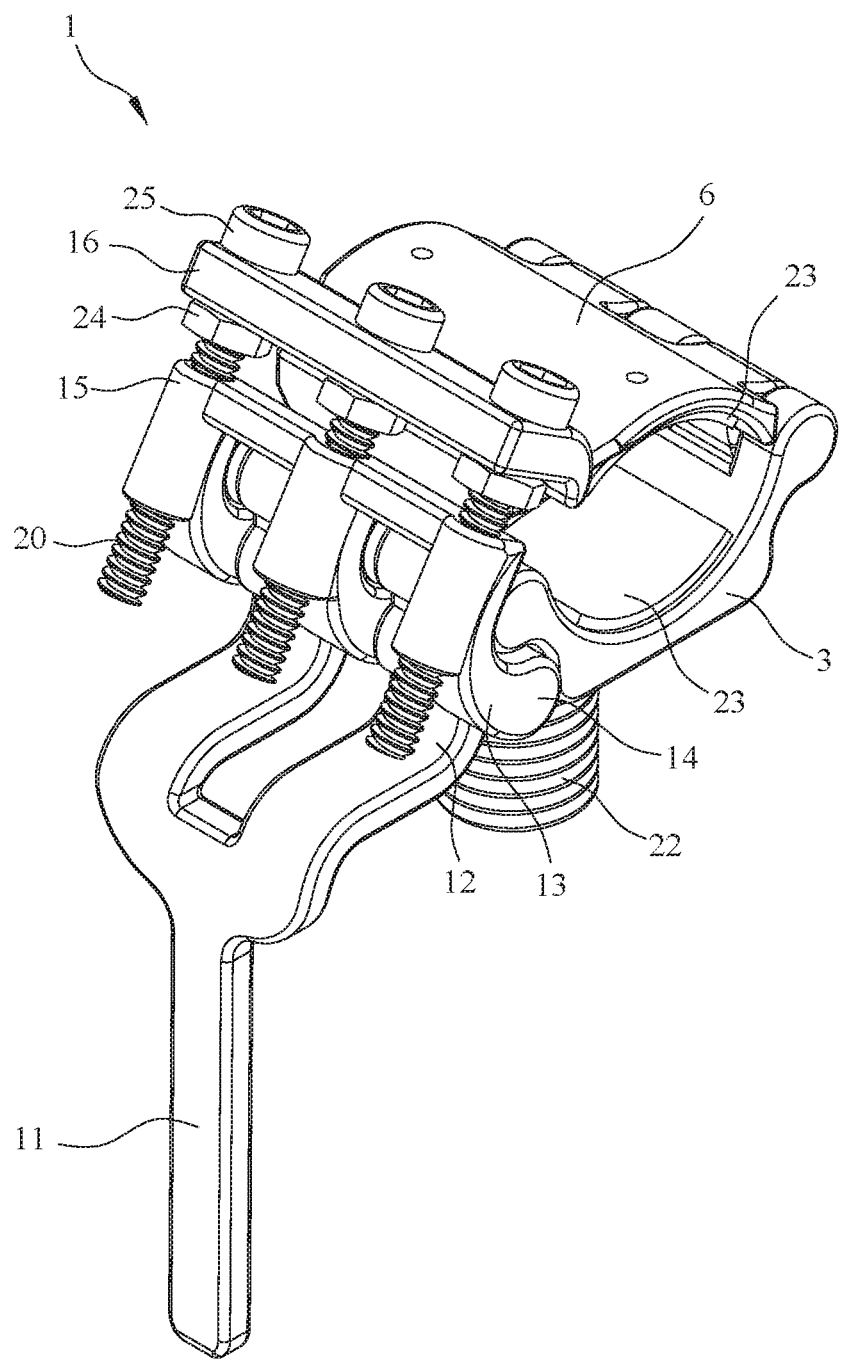
FIG. 2 illustrates a perspective view of an adjustable fixture of the present invention for clamping a tube-like object in a closed position.
Figure 3:
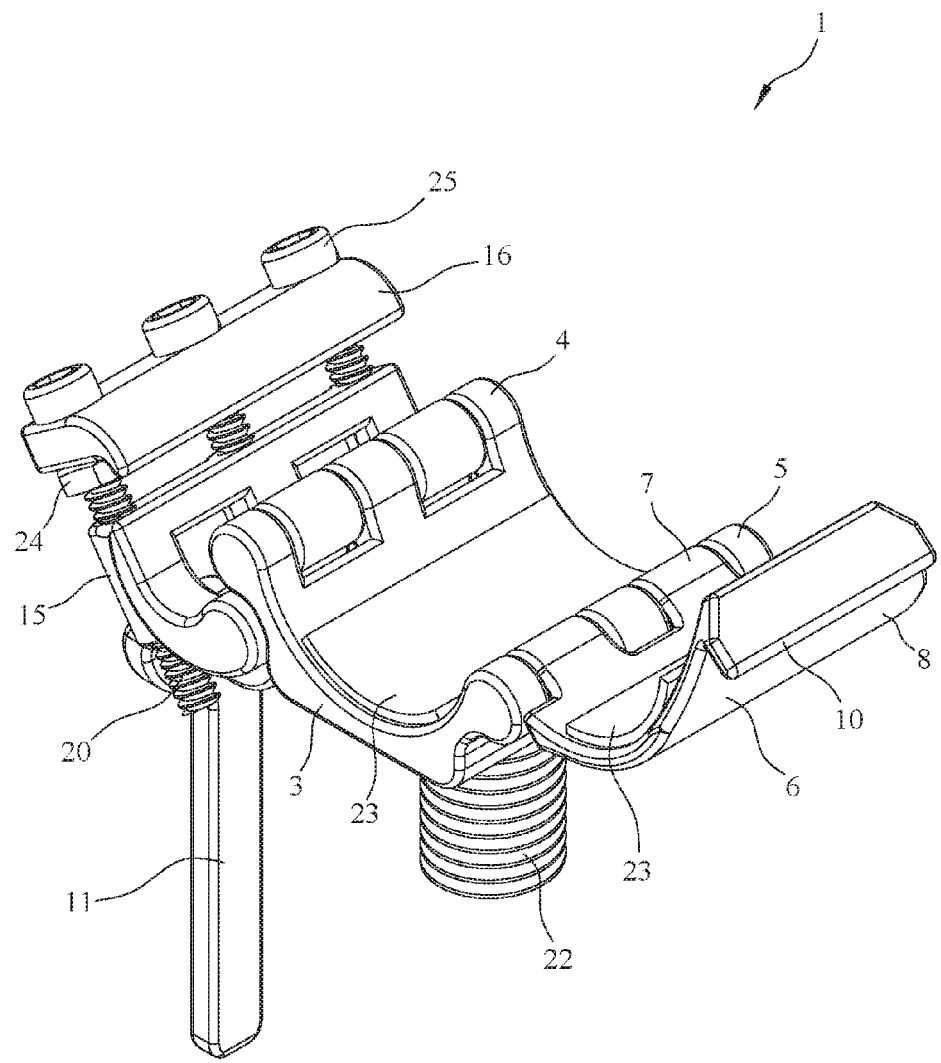
FIG. 3 illustrates a perspective view of the adjustable fixture of the present invention for clamping a tube-like object in an open position.
Figure 4:
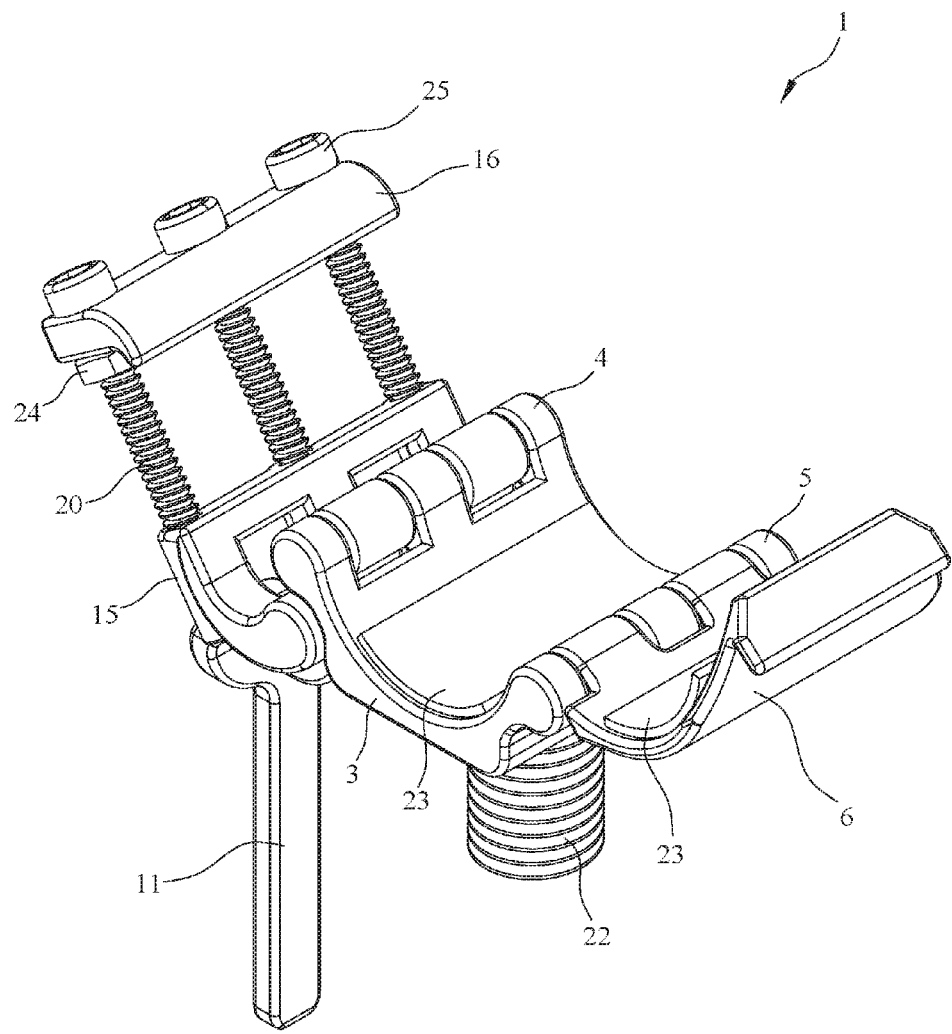
FIG. 4 illustrates a perspective view of the adjustable fixture of the present invention in an open position after adjustment.

Referring to FIGS. 2 to 4, wherein FIG. 2 illustrates a perspective view of an adjustable fixture 1 of the present invention for clamping a tube-like object 2 in a closed position; FIG. 3 illustrates a perspective view of the adjustable fixture 1 of the present invention for clamping a tube-like object in an open position; and FIG. 4 illustrates a perspective view of the adjustable fixture 1 of the present invention in an open position after adjustment. As illustrated, the adjustable fixture 1 according to the present invention includes a lower clamp piece 3 of generally semi-circle shape having first and second lateral sides 4, 5 opposite to each other; an upper clamp piece 6 of generally semi-circle shape having third and fourth lateral sides 7, 8 opposite to each other, wherein the third lateral side 7 is connected pivotally to the second lateral side 5 of the lower clamp piece 3 such that the upper clamp piece 6 is pivotable relative to the lower clamp piece 3 between a closed position (see FIG. 2), where the upper clamp piece 6 covers the lower clamp piece 3 to define a clamping space 9 (see FIG. 6) therebetween, and an open position, where the lower clamp piece 3 is uncovered by the upper clamp piece 6 (see FIG. 3), the upper clamp piece 6 further having an anti-hook edge 10 projecting outward from the fourth lateral side 8; a torque rod 11 having a first end 12 pivoted to the first lateral side 4 of the lower clamp piece 3; a traction element 13 having a first traction end 14 pivoted to the torque rod 11 adjacent to the first end 12 thereof and a second traction end 15 that is opposite to the first traction end 14 and that defines a threaded through hole 18, the traction element 13 including a thread bolt 20 disposed threadedly and movably in the threaded through hole 18; and a hook 16 disposed on the second traction end 15 of the traction element 13 and operably associated so as to be movable together with the threaded bolt 20 in such a manner to engage a barbed end 17 of the hook 16 with the anti-hook edge 10 of the upper clamp piece 6 when the upper clamp piece 6 is disposed at the closed position, thereby preventing the upper clamp piece 6 to pivot back to the open position. It is to note that the configuration or shape of the upper and lower clamp pieces 6, 3 or the clamping space 9 should not be restricted only to the disclosed ones, any other configuration or shape should be included within the spirit of the present invention.

In one embodiment of the present invention, the adjustable fixture 1 further includes a bottom seat 21 (see FIG. 6) with external threads 22 extending downwardly from the lower clamping piece 3 for fastening onto a stationary foundation (not visible).

In one embodiment of the present invention, the low clamping piece 3 further includes another adjustable fixture 1 such that two tubes 2 of different dimensions (not visible) can be clamped by two adjustable fixtures 1 according to the present invention so as to fix the tubes 2 stationarily within a working site (not shown). In other words, the adjustable fixture 1 of the present invention serves a universal joint for fixing two pipes together, as in the plumbing of a factory.

In one embodiment of the present invention, a lower part of the lower clamp piece 3 of the adjustable fixture 1 according to the present invention can be fixed an external part of an ordinary wheeled chair (not shown). To be more specific, the lower part of the lower clamp piece 3 of the adjustable fixture 1 is fastened securely on a front part of the wheeled chair, after which a rear part of a tractor (not shown) is disposed in the clamping space of the adjustable fixture 1 such that when the tractor travels in the forward direction, the wheeled chair will be pulled along behind the tractor (not visible).

Alternately, a lower part of the lower clamp piece 3 of the adjustable fixture 1 can be fixed on a tractor (not visible), after which a wheeled chair to be pulled is fastened to the clamping space of the adjustable fixture 1 such that the wheeled chair will be pulled when the tractor is driven forward.

Preferably, the adjustable fixture 1 of the present invention further includes lower and upper cushion pads 23 configured to be mounted on inner surfaces of the lower and upper clamping pieces 3, 6 so as to provide additional friction force between the adjustable fixture of the present invention and an object being clamped.

One aspect to note is that the object 2 to be clamped in the adjustable fixture 1 of the present invention should not be limited only to the tube-like object, any other geometric configuration should also be clamped in the adjustable fixture 1 of the present invention.

In this embodiment, a hinge is used for connecting pivotally the third lateral side 7 of the upper clamp piece 6 to the second lateral side 5 of the lower clamp piece 3, or for connecting pivotally the first end 12 of the torque rod 11 to the first lateral side 4 of the lower clamp piece 3 or for connecting pivotally the first traction end 14 of the traction element 13 to the torque rod 11 adjacent to the first end 12 thereof.

Preferably, the traction element 13 is generally L-shaped and extends toward the upper clamp piece 6 (see FIG. 2) when in the closed position.

Preferably, in this embodiment, the torque rod 11 has a rod section being bent 90 relative to the upper clamp piece 6 in a first direction and another rod section being bent relative to the upper clamp piece 6 in a second direction opposite to the first direction.

In another embodiment of the present invention, the threaded bolt 20 has a bolt head 25, the adjustable fixture 1 further includes a threaded nut 24 mounted threadedly on the threaded bolt 20 in such a manner to secure the hook 16 between the bolt head 25 and the threaded nut 24, thereby preventing wobbling of the hook 16 relative to the threaded bolt 20 and hence securing the position of the hook 16 relative to the threaded bolt 20.

Figure 5:
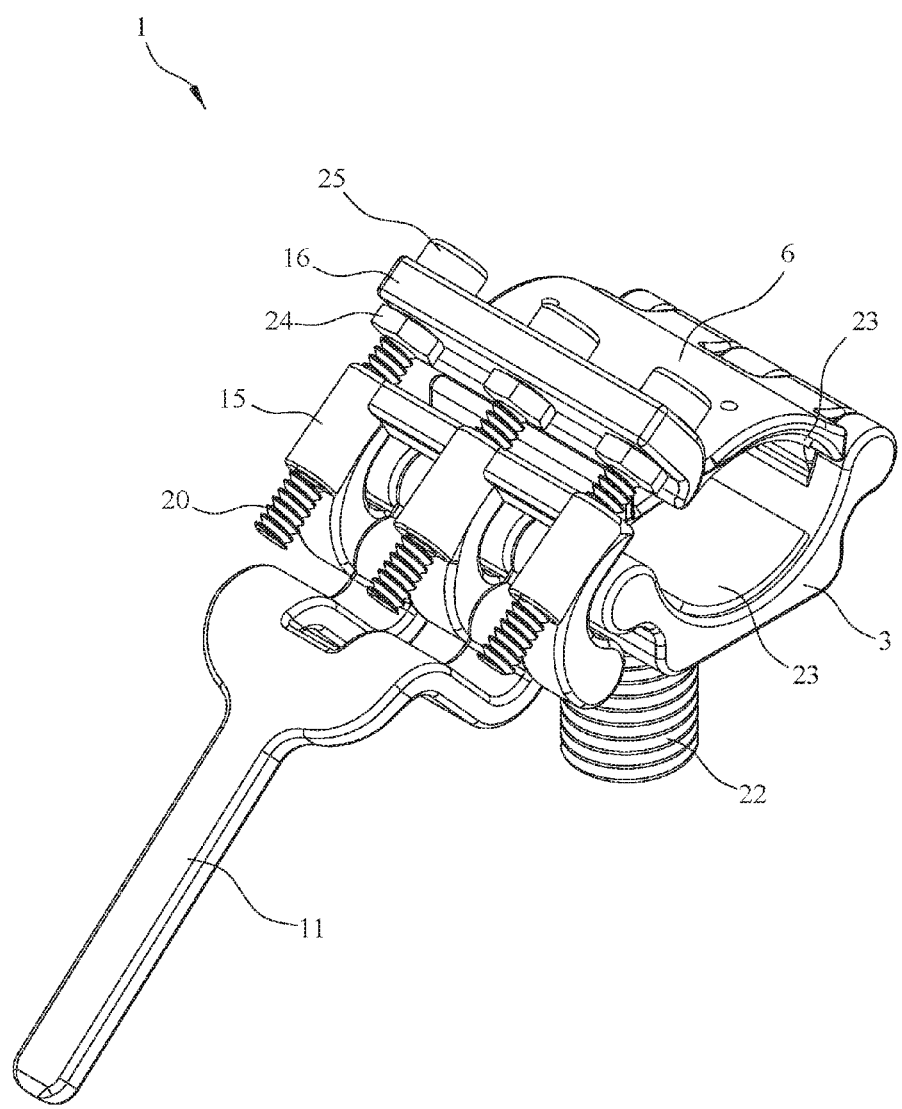
FIG. 5 illustrates the adjustable fixture of the present invention clamping a tube-like object.
Figure 6:
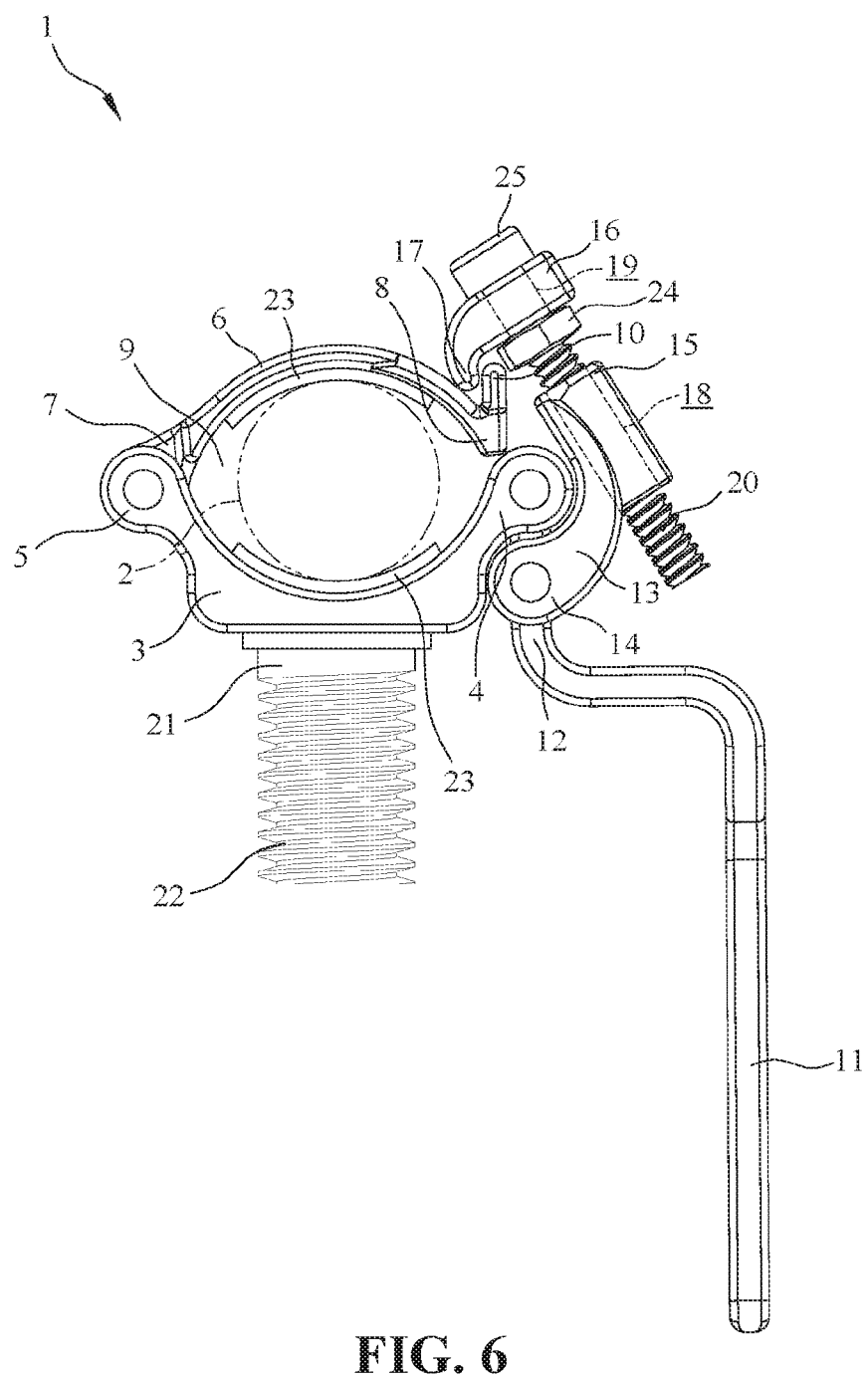
FIG. 6 illustrates a lateral side view of the adjustable fixture of the present invention clamping a tube-like object.

Referring to FIGS. 3, 5 and 6, in one embodiment of the present invention, the second traction end 15 of the traction element 13 defines three threaded through holes 18 respectively receiving three threaded bolts 20 therein. Each of the threaded bolts 20 has a bolt head 25. The adjustable fixture 1 according this embodiment includes three threaded nuts 24 respectively and threadedly fastened to the threaded bolts 20 while the hook 16 is formed with three sleeve holes 19 respectively sleeved around the corresponding threaded bolt 20 in such a manner that the hook 16 is secured between adjacent pairs of the bolt heads 25 and the threaded nuts 24, thereby preventing wobbling of the hook 16 relative to the threaded bolts 20 and providing additional engagement of the hook 16 with respect to the threaded bolts 20.

FIG. 3 illustrates a perspective view of the adjustable fixture 1 of the present invention for clamping a tube-like object in an open position, wherein the anti-hook edge 10 of the upper clamp piece 6 is disengaged from the barbed end 17 of the hook 16.

FIG. 4 illustrates a perspective view of the adjustable fixture of the present invention in an open position after adjustment. In case of the object to be clamped is not compatible with the clamping space 9, the dimension of the clamping space 9 can be varied by moving the 16 along the threaded bolts 20, after which, the position of the hook 16 relative to the threaded bolts 20 can be fixed securely by adjacent pairs of the bolt heads 25 and the threaded nuts 24.

As explained above, after adjustment of the clamping space 9 as shown in FIG. 4 and in case it is desired to clamp an object, the upper clamp piece 6 is pivoted relative to the lower clamp piece 3 to a closed position first of all. After which, the torque rod 11 is pivoted relative to the lower clamp piece 3, as best shown in FIG. 5, where the hook 16 does not engage the anti-hook edge 10 of the upper clamp piece 6 due to being stopped midway of the pivotal action and wherein the barbed end 17 of the hook 16 engages the anti-hook edge 10 of the upper clamp piece 6 after the torque rod 11 is pivoted fully relative to the lower clamp piece 3, as best shown in FIG. 6. Under this condition, the tube-like object 2 is clamped securely within the clamping space 9 of the adjustable fixture 1 of the present invention.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An adjustable fixture for clamping a tube-like object therein regardless of variation in the dimension, comprising:
    a lower clamp piece of generally semi-circle shape having first and second lateral sides opposite to each other;
    an upper clamp piece of generally semi-circle shape having third and fourth lateral sides opposite to each other, wherein the third lateral side is connected pivotally to the second lateral side of the lower clamp piece such that the upper clamp piece is pivotable relative to the lower clamp piece between a closed position, where the upper clamp piece covers the lower clamp piece to define a clamping space therebetween, and an open position, where the lower clamp piece is uncovered by the upper clamp piece, the upper clamp piece further having an anti-hook edge projecting outwardly from the fourth lateral side;
    a torque rod having a first end pivoted to the first lateral side of the lower clamp piece;
    a traction element having a first traction end pivoted to the torque rod adjacent to the first end thereof and a second traction end that is opposite to the first traction end and that defines a threaded through hole, the traction element including a threaded bolt disposed threadedly and movably in the threaded through hole; and
    a hook disposed on the second traction end of the traction element and operably associated so as to be movable together with the threaded bolt in such a manner to engage the hook with the anti-hook edge of the upper clamp piece when the upper clamp piece is disposed at the closed position, thereby preventing the upper clamp piece to pivot back to the open position.

2. The adjustable fixture according to claim 1, further comprising a bottom seat with external threads extending downwardly from the lower clamping piece for fastening onto a stationary foundation.

3. The adjustable fixture according to claim 1, further comprising lower and upper cushion pads configured to be mounted on inner surfaces of the lower and upper clamping pieces.

4. The adjustable fixture according to claim 1, wherein a hinge is used for connecting pivotally the third lateral side the upper clamp piece to the second lateral side of the lower clamp piece, or for connecting pivotally the first end of the torque rod to the first lateral side of the lower clamp piece or for connecting pivotally the first traction end of the traction element to the torque rod adjacent to the first end thereof.

5. The adjustable fixture according to claim 1, wherein the traction element is generally L-shaped and extends toward the upper clamp piece when in the closed position, the torque rod having a rod section being bent 90 degree relative to the upper clamp piece in a first direction and another rod section being bent 90 degree relative to the upper clamp piece in a second direction opposite to the first direction.

6. The adjustable fixture according to claim 1, wherein the threaded bolt has a bolt head, the adjustable fixture further comprising a threaded nut mounted threadedly on the threaded bolt in such a manner to secure the hook between the bolt head and the threaded nut, thereby preventing wobbling of the hook relative to the threaded bolt and providing additional engagement of the hook with respect to the threaded bolts.

7. The adjustable fixture according to claim 1, wherein the second traction end of the traction element defines three threaded through holes respectively receiving three threaded bolts therein, each of the threaded bolts having a bolt head, the adjustable fixture comprising three threaded nuts respectively and threadedly fastened to the threaded bolts while the hook defines three sleeve holes respectively sleeved around the corresponding threaded bolt in such a manner that the hook is secured between adjacent pairs of the bolt heads and the threaded nuts, thereby preventing wobbling of the hook relative to the threaded bolt and providing additional engagement of the hook with respect to the threaded bolts.

* * * * *